UNITED STATES PATENT OFFICE.

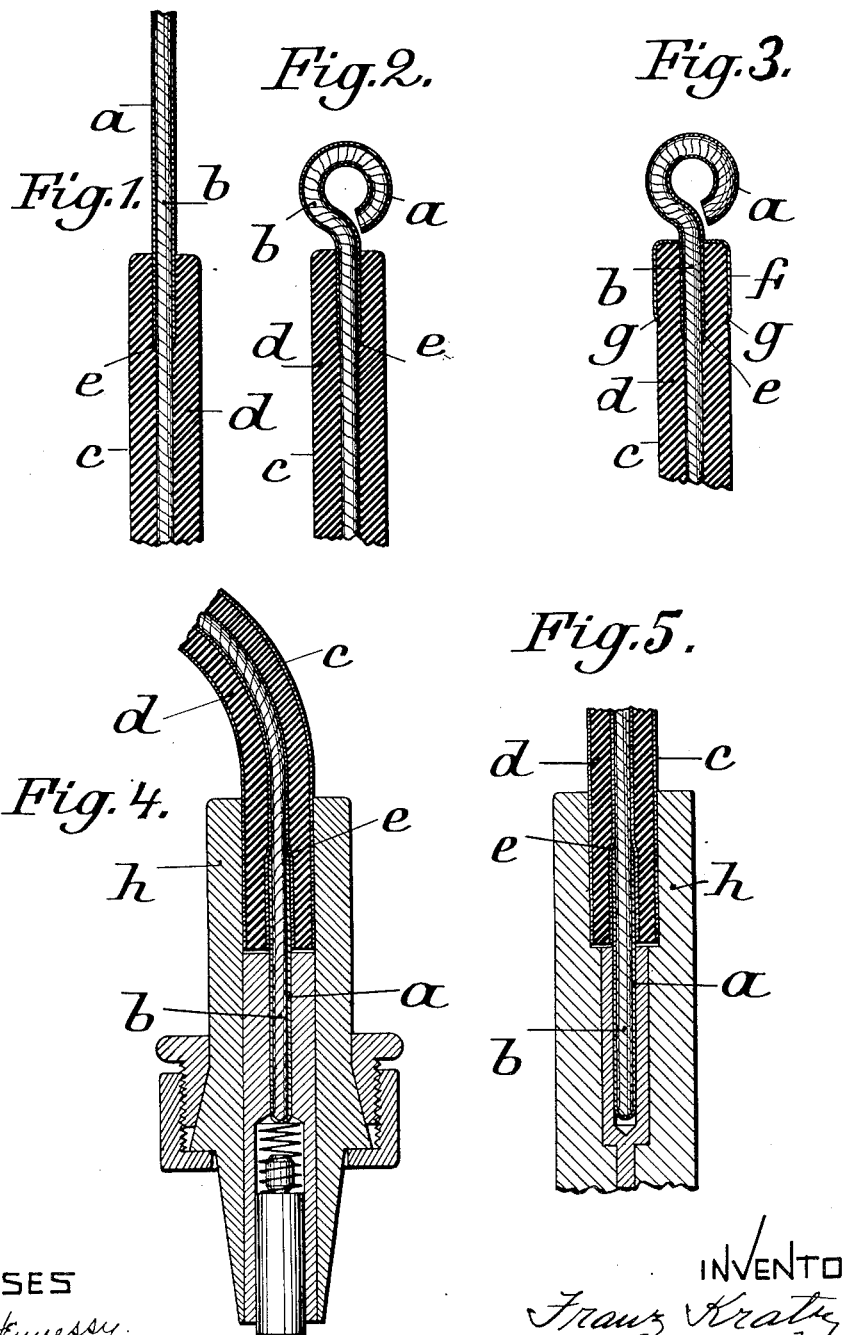

FRANZ KRATZ, OF STUTTGART, GERMANY, ASSIGNOR TO THE FIRM OF ROBERT BOSCH, OF STUTTGART, GERMANY.

CABLE-CONNECTOR.

1,070,899.  Specification of Letters Patent.  Patented Aug. 19, 1913.

Application filed June 1, 1910. Serial No. 564,412.

*To all whom it may concern:*

Be it known that I, FRANZ KRATZ, engineer, a subject of the German Emperor, residing at 59a Schloss strasse, Stuttgart, Germany, have invented certain new and useful Improvements in Cable-Connectors; and I do hereby declare the following to be a full, clear, and exact description of the invention, such as will enable others skilled in the art to which it appertains to make and use the same.

The invention relates to the formation of a cable connector, of the kind appropriate, for instance, for ignition apparatus employed for the electrical ignition of combustion engines.

It consists essentially in slipping over the previously exposed end of an ordinary multiplex wire core of a cable, a sleeve of current conducting material, which sleeve envelops all of the strands of the cable and penetrates the insulation at the base of the exposed end, and which may be soldered at its free end to the cable core, in case the cable end is used as a contact plug. If desired, the sleeved end of the core may be bent to a U-shape or in the form of an eye to constitute a contact terminal.

In Figs. 1 to 5, various modifications and uses of the invention are illustrated, partly in section and partly in elevation. In each instance, after the insulation has been removed from the end of the core $b$ of the cable $c$, the sleeve $a$ of conducting material is, as illustrated in Fig. 1, pushed over the exposed end of the core $b$ in such manner that it penetrates for a certain distance into the insulation $d$. In order to facilitate the introduction of the sleeve $a$ into the insulation, it may be made conically pointed at $e$.

In Fig. 2, the exposed end of the cable core $b$, after it has been sheathed by the sleeve $a$, is bent in the shape of an eye, so that a cable contact terminal is formed thereby, which is adapted to take the place of the customary form of cable contact terminal or clip heretofore employed. The eye is placed over the screw-threaded end of the binding post and is clamped fast by means of a nut, as will be readily understood.

In the modification shown in Fig. 3, the employment of the conducting sleeve, in accordance with the present invention, is shown as supplemented by an extra sleeve $f$, pressed into the insulation as at $g$, and serving to protect the end of the woven insulation.

Figs. 4 and 5 show the use of the sheathed cable end in current distributers or carbon brush holders, as, for instance, those which are employed in connection with electrical ignition apparatus. The cable end shown in Fig. 1 is, in such case, introduced into the connector $h$ to such a distance that the insulation extends into the connector. In this manner, a more secure connection of the conducting parts of the cable plug is attained in the simplest manner.

The invention offers the advantage that an excellent contact terminal may be formed on the end of an ordinary insulated cable by the simple expedient of stripping the end of the cable and slipping over the exposed end, one of the conducting sleeves $a$, which, upon being pressed into the insulation, is fixed in place on the end of the cable, without the use of any special tools and without soldering or the like.

What I claim is:

1. The combination with an insulated conductor cable having a multiplex wire core whose end protrudes beyond the insulation, of a cylindrical conducting sleeve of uniform diameter closely fitting the protruding core and extending between the core and its insulation at the base of the protruding core end.

2. The combination with an insulated conductor cable having a multiplex wire core whose end protrudes beyond the insulation, of a cylindrical conducting sleeve of uniform diameter closely fitting the protruding end of the core, and having a sharpened end whereby it is adapted to penetrate between the core and its insulation.

In testimony whereof I have affixed my signature, in presence of two witnesses.

FRANZ KRATZ.

Witnesses:
 MAX ANSCHUTZ,
 REINHOLD ELWERT.